United States Patent
Pathak et al.

(10) Patent No.: US 7,387,728 B2
(45) Date of Patent: Jun. 17, 2008

(54) ANIMAL POWERED MECHANICAL DEVICE FOR WATER DESALINATION

(75) Inventors: Nagendra Pathak, Gujarat (IN);
Pushpito Kumar Ghosh, Gujarat (IN);
Sohan Lal Daga, Gujarat (IN);
Virendra Jayantilal Shah, Gujarat (IN);
Sanat Natubhai Patel, Gujarat (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 11/169,566

(22) Filed: Jun. 28, 2005

(65) Prior Publication Data
US 2006/0070939 A1    Apr. 6, 2006

Related U.S. Application Data

(63) Continuation of application No. PCT/IB02/05606, filed on Dec. 23, 2002.

(51) Int. Cl.
*B01D 61/08* (2006.01)
*B01D 61/10* (2006.01)

(52) U.S. Cl. .................. 210/252; 210/257.2; 210/258; 210/321.6; 210/321.76; 210/321.85; 210/416.1; 210/650; 210/652

(58) Field of Classification Search .............. 210/252, 210/257.2, 258, 321.6, 321.76, 321.85, 416.1, 210/650, 652
See application file for complete search history.

(56) References Cited

U.S. PATENT DOCUMENTS

| 2,084,612 | A | * | 6/1937 | Engelheart | 310/83 |
| 4,814,086 | A | * | 3/1989 | Bratt | 210/636 |
| 6,936,176 | B1 | * | 8/2005 | Greene, III et al. | 210/702 |
| 7,029,576 | B2 | * | 4/2006 | Siegfriedsen | 210/153 |

FOREIGN PATENT DOCUMENTS

| GB | 528275 | 10/1940 |
| WO | WO 91/09226 | * 6/1991 |

OTHER PUBLICATIONS

Derwent Abstract of CN 1174289 A (2001).*
English Abstract of ZA 8 004 236 dated Jul. 29, 1981.
Liu, Clark C.K., et al. "Experiments of a prototype wind-driven reverse osmosis desalination system with feedback control." *Desalination*, Elsevier Scientific Publishing Co., Amsterdam, NL vol. 150, No. 3 (2002) pp. 277-287.

* cited by examiner

*Primary Examiner*—John Kim
(74) *Attorney, Agent, or Firm*—Ladas & Parry LLP

(57) ABSTRACT

This invention provides animal powered mechanical device for water desalination. It has unique features of using animal power as prime mover to effect brackish water desalination. Animal energy in form of high-torque low-speed can be converted into low-torque high-speed through speed increaser (4) to energize the high-pressure pump (6), the outlet manifold (8) of the pump (6) being connected to a reverse osmosis membrane module (9). With this device animal power can be used for obtaining safe drinking water from backish ground water/seawater resource in villages.

14 Claims, 1 Drawing Sheet

ANIMAL POWERED MECHANICAL DEVICE FOR WATER DESALINATION

Figure 1:
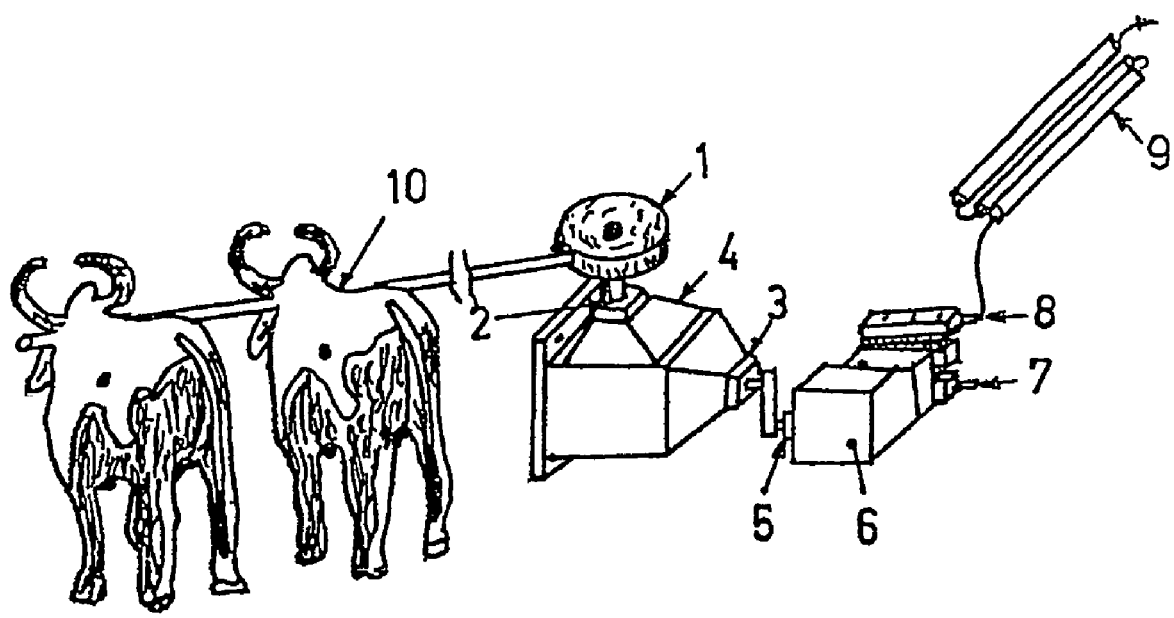

This is a continuation of application number PCT/IB2002/005606 filed on 23 Dec. 2002, which designated the U.S., claims the benefit thereof and incorporates the same by reference.

FIELD OF THE INVENTION

The present invention relates to an animal powered mechanical water desalination device. The animal powered mechanical device of the present invention is particularly useful for desalting brackish water. The device is generally useful for converting high-torque low-speed into low-torque high-speed. Using this device, animal power is converted into hydraulic pressure energy. The device is useful, for example, for converting seawater into safe drinking water. Using this device, animal power is particularly enhanced for separation mechanism. The device is useful for water desalination in rural technology for safe drinking water. Using this device, animal power in village industry can be utilized for minimizing health hazards due to brackish ground water consumption.

BACKGROUND OF THE INVENTION

Reference is made to N. S. Ramaswamy in "Management of animal energy resources in India", Indian Institute of Management, Bangalore, 1979, pp. 56-62 wherein bio-energy from animals is described as the principal source of motive power in Indian farming. Animal drawn ploughs and vehicles have been part of the rural scenario in India and other countries for several years. Agriculture practices in countries such as India fundamentally differ from those of western countries, mainly because Indian agriculture is based on animal power. For example, in India, animals contribute over 28 million hp of energy per day for agriculture operations. Off the total-working animals in India roughly 87% are working bullocks, 9% male buffaloes, 3% cows and 1% she-buffaloes. Work-animals are principally used for ploughing and then for drawing carts. The majority of an estimated 15 million animal drawn vehicles in India are powered by bullocks and the remaining by others. The aggregate investment in the system (including the cost of animals) is of the order of Rs.300000 million.

On the basis of selected sample surveys conducted in India, over 60% of the transportation needs of agriculture sector appears to be met by bullock carts, including 90% of all intra-village goods transport. On an average, one pair of draft animals is being utilized for 4 hectares of cropped area with a range from 1.8 hectares to 10.2 hectares in different states.

Policy makers, planners or professionals in India have not adequately recognized the magnitudes of animal energy available for exploitation and its potential for development. Many attempts are however, being made to assess the energy output of work animals, which is dependent on breed, size, weight and nutrition levels. The draft capacity of a work-animal varies from 0.4 to 1 hp. For purposes of calculation of energy availability, a low average of 0.5 hp is assumed, based on animal exerting about 50 kg of draft and walking at the rate of two miles per hour over a sustained period of time. On this basis, the energy made available by 80 million work-animals in India may be around 40 million hp. This is equivalent to 30000 megawatts of electrical power. Animal power would cost about Rs.10000 crores only, whereas to produce the same power in electrical energy, an investment of Rs.30000 crores is required. Thus, when animal energy is abundantly available at about a third of the cost of electrical energy and cheaper even than petroleum energy, it will be wise to utilize the animal energy for other applications in India or abroad. Work-animals are principally used for ploughing and next for drawing carts whereas the present invention utilizes work-animals for desalination of brackish water and making it safe for drinking. The present invention will benefit villages to utilize their own resources.

Reference is also made to Mick Hamer in a paper entitled "Horse power beats diesel", New Scientist, 13 Jul. 2002, pp. 11, wherein a study carried out by Torbjorn Rydberg and Jan Jansen of the Swedish University of Agriculture Sciences at Uppsala found that a tractor tilling a field burns fuel containing about 67% more energy than a horse would have to eat to do the same job. Similarly animal power driven mechanical device for water desalination will require less energy than an electric or diesel power driven water desalination system.

References is made to B. G. Keefer, R. D. Hembree and F. C. Schrack in a paper entitled "Optimized matching of solar photovoltaic power with reverse osmosis (RO) desalination", Desalination, 54(1985), pp-89-103, wherein solar photovoltaic powered RO desalination system are considered attractive for many remote locations, where the need for desalted water often coincides with the absence of conventional power resources. Potential application sites are islands, isolated settlements on arid coasts and inland brackish water wells. Conventional desalination systems are both energy-intensive and capital-intensive whereas solar photovoltaic powered RO desalination is relatively high-energy efficiency system with inherent simplicity.

While reservations may exist about solar photovoltaic powered RO desalination system because of its highly capital-intensive whereas animal powered RO desalination system is less capital-intensive. RO desalination process uses semi-permeable membranes bundled in cylindrical shape called module operate under cross-flow conditions. Under pressure there are two flows: permeate with reduced ion concentration crossing through the membrane and concentrate with high level of ion concentration. The required pressure and energy/power depend on the given ion concentration of the raw water and the anticipated flow of permeate. There is a broad variety of RO membranes module such as spiral wound, hollow fine fiber, tubular and plate and frame type available commercially. RO membranes module is basically categorized into low-pressure module and high-pressure module.

Low pressure RO membranes module is used to produce potable water from brackish water, with a total dissolved solids (TDS) concentration of <10,000 mg/L. High pressure RO membranes module is used for the production of drinking water, if the TDS concentration exceeds 10,000 mg/L value. The limit of the TDS concentration in drinking water is 500 mg/L as set by the World Health Organization.

Prior art literature survey and patent search do not reveal animal powered mechanical device for water desalination.

OBJECT OF THE INVENTION

The main object of the invention is to provide animal powered mechanical device for water desalination Another object of the invention is to provide animal powered mechanical device that can convert high-torque low-speed into low-torque high-speed.

Still another object of the invention is to provide mechanical device that enables use of animal power for brackish or seawater water desalination.

Yet another object of the invention is to provide animal powered device that converts animal power into hydraulic pressure energy for water desalination.

Still another object of the invention is to provide a device that will facilitate villages to use animal power for brackish ground water desalination.

Yet another object of the invention is to provide mechanical device for the use of animal power as an alternative to electrical power for water desalination.

Another object of the invention is to enable the use of animal power as an alternative to the conventional electric power/diesel power.

A further object of the invention is to provide a mechanical device may be used in village industry for obtaining safe drinking water.

SUMMARY OF THE INVENTION

Accordingly the present invention provides an animal powered mechanical water desalination device movable by a prime mover, which comprises:
(i) A mechanical link means provided with an extended pipe to transmit animal power in form of high-torque low-speed to a speed increaser;
(ii) a speed increaser provided with an input shaft and an output shaft for converting animal power received from a mechanical link in the form of a high-torque low-speed to low-torque high-speed;
(iii) a high-pressure pump provided with a crankshaft which is connected to the output shaft of the speed increaser for converting mechanical energy in form of low-torque high-speed received from the speed increaser to hydraulic pressure energy;
(iv) osmotic means to convert brackish water into potable water.

In one embodiment of the invention, the mechanical link means comprises of a link of mild steel of 210 mm diameter and 230 mm length and the extended pipe is made of extra strong mild steel of 76 mm bore diameter, and 4000 mm length and 8 mm wall thickness.

In yet another embodiment of the invention, the speed increaser is of 510 mm×400 mm×300 mm dimension and comprises of a gear set made of hardened steel.

In yet another embodiment of the invention, the high pressure pump is made of AISI-316 stainless steel material.

In a further embodiment of the invention, the osmotic means comprises of one or more reverse osmosis membranes.

In another embodiment of the invention, the mechanical link means is mounted on the input shaft of the speed increaser.

In yet another embodiment of the invention, the high pressure pump is provided with at least an inlet manifold for water suction and at least an outlet manifold connected to the osmotic means for generating hydraulic pressure for water desalination by the osmotic membrane means.

In another embodiment of the invention, the prime mover comprises of at least one draught animal.

In a further embodiment of the invention, the draught animal is a bull.

In an embodiment of the invention animal energy is used for water desalination.

In another embodiment of the invention animal power has been used as a prime mover to effect water desalination.

In yet another embodiment of the invention the device is capable of converting high-torque low-speed into low-torque high-speed.

In still another embodiment of the invention animal energy is converted into hydraulic energy for the use of salt removal from brackish water.

In yet another embodiment of the invention speed increaser increases the speed by reducing the high torque.

BRIEF DESCRIPTION OF THE ACCOMPANYING DRAWING

FIG. 1 shows a schematic representation of the device of the invention in actual use.

DETAILED DESCRIPTION OF THE INVENTION

This invention provides animal powered mechanical device for water desalination. It has unique features of using animal power as prime mover to effect brackish water desalination. Animal energy in form of high-torque low-speed can be converted into low-torque high-speed through speed increaser to energize the high-pressure pump. With this device animal power can be used for obtaining safe drinking water from brackish ground water/seawater resource in villages.

The device comprises of a mechanical link means provided with an extended pipe to transmit animal power in form of high-torque low-speed to a speed increaser; a speed increaser provided with an input shaft and an output shaft for converting animal power received from a mechanical link in the form of a high-torque low-speed to low-torque high-speed; a high-pressure pump provided with a crankshaft which is connected to the output shaft of the speed increaser for converting mechanical energy in form of low-torque high-speed received from the speed increaser to hydraulic pressure energy; and an osmotic means to convert brackish water into potable water. The prime mover is preferably at least one draught animal such as a bull. More preferably, the prime mover comprises of a pair of bulls.

The device of the invention will now be described with reference to the accompanying drawing. In FIG. 1, the mechanical link (1) is of mild steel material having 210 mm.diameter and 230 mm.length with extended extra strong mild steel pipe of 76 mm.diameter and 4000 mm.length of 8 mm.wall thickness. Input shaft (2) of hardened mild steel material having 75 mm.diameter and 150 mm.length is provided for coupling the mechanical link (1) to speed increaser (4) of mild steel body having 510 mm×400 mm.×300 mm.dimension with various sets of gears. Output shaft (3) of hardened mild steel material having 30 mm.diameter and 120 mm.length is provided to speed increaser for coupling the crankshaft (5) of hardened mild steel having 50 mm.diameter and 140 mm.length. High-pressure pump (6) of AISI-316 stainless steel material is having crankshaft (5) for connecting output shaft (3) of the speed increaser (4). High-pressure pump (6) has inlet manifolds (7) of AISI-316 stainless steel material having 30 mm diameter and 75 mm.length and outlet manifolds (8) of AISI-316 stainless steel material having 19 mm.diameter and 75 mm.length. RO membrane module (9) is connected to the outlet manifolds (8) of the pump. Pair of bulls' (10) is coupled to the mechanical link (1).

The details of animal powered mechanical device and its operation are:

(i) Mechanical link: mechanical link of mild steel material having 210 mm.diameter and 230 mm.length with extended extra strong mild steel pipe of 76 mm.bore-diameter, 4000 mm.length and 8 mm.wall thickness capable of transmitting animal power in form of high-torque low-speed is attached to speed increaser.

Mechanical link starts moving in a circular path of 8 meter diameter when a pair of bulls' attached to mechanical link with the help of rope start moving. A pair of bulls' moves in a circular path of 8 meter diameter with approximate speed of 50 meter/min. Input shaft of the speed increaser coupled to mechanical link rotates at 2 rpm when a pair of bulls completes one round of 8 meter dia.circular path in one minute.

(ii) Speed increaser: speed increaser is a set of spiral, bevel and helical gears housed in a rectangular box of mild steel material having 510 mm.×400 mm.×300 mm.dimension. It is having 3 numbers of stages with gear ratio of 1:100. Input shaft of the speed increaser having 75 mm.diameter and 150 mm.length of hardened mild steel material is in vertical position whereas output shaft having 30 mm.diameter and 120 mm.length of hardened mild steel material of the same is in horizontal. Speed increaser is specially designed for transmitting and converting low-speed high-torque to high-speed low-torque. Output horizontal shaft of the speed increaser starts rotating at 200 rpm when input shaft of the same coupled with mechanical link rotates at 2 rpm.

(iii) High-pressure pump: high-pressure pump is of triplex plunger type made of AISI-316 stainless steel material having discharge capacity of 20 LPM at 300 psi. Crankshaft of the pump is coupled to output horizontal shaft of the speed increaser and therefore pump runs at 200 SPM giving 20 LPM discharge at 300 psi pressure. Pump running at 200 SPM delivers 20 LPM discharge at 300 psi pressure when its suction port is connected to the brackish water tank.

(iv) RO membranes module: spiral wound thin film composite membranes module of 4 inch diameter and 1 meter length housed in pressure vessel having permeate and concentrate flow connections at one end and high pressure hose pipe connection at other end is coupled to high pressure pump's discharge. Brackish water at 300 psi of 20 LPM flow entering into pressure vessel containing spiral wound thin film composite membrane modules is bifurcated into two streams. One as permeate with reduced ion concentration and other as concentrate with high level of ion concentration.

(v) Pair of bulls: pair of bulls' capable of exerting more than 100 kg of draft and walking at the rate of 50 meter/minute is coupled to mechanical link with the help of rope. Pair of bulls' generates 300 psi pressure of 20 LPM discharge when it completes one rotation of 8 meter dia.circular path.

The novelty of the animal powered mechanical device for water desalination, comprising in combination of (i) mechanical link, (ii) speed increaser, (iii) high pressure pump, (iv) RO membranes module and (v) a pair of bulls'; is that it provides animal power as an alternative to conventional electric/diesel power for brackish ground water desalination in village industry. More over seawater can also be converted into safe drinking water. The device can also be enhanced for separation mechanism.

The inventive steps of the device of present invention, which enable the above said novelty of providing water desalination using animal power, are a functioning combination of the sub-systems:

1. Animal power in the form of a pair of bull's, through mechanical link has been provided for water desalination.
2. Speed increaser converts animal power in the form of high-torque low-speed to low-torque high-speed for energizing the high-pressure pump.
3. High-pressure pump through speed increaser provides sufficient pressure for brackish water being desalted.
4. RO membranes module provides desalination of brackish water.

The following examples are given for illustrative purposes and provide the functioning of the device and steps involved in desalination of brackish water using the device of the present invention. These examples being illustrative should not be construed to limit the scope of the present invention.

EXAMPLE-1

Brackish water of 5,000 mg/L TDS is prepared in a 1000 liters capacity sintex water tank by adding sodium chloride salt. Sintex water tank having exit pipe connection of one-inch diameter is connected to the inlet port of high-pressure pump through PVC braided hosepipe. Outlet port of high-pressure pump is connected to the inlet of the RO membrane modules through high-pressure hosepipe. Pressure gauge having 0 to 600 psi measuring range is connected in-between outlet port of the pump and inlet of the RO membrane modules. Bifurcated streams of modules termed as permeate and concentrate are connected to the two different sintex water tanks respectively through hosepipe. A pressure regulating valve is connected in-between modules and concentrate streams.

EXAMPLE-2

A pair of bulls is connected to the extended pipe of mechanical link with the help of rope. Input shaft of speed increaser coupled with mechanical link starts rotating when a pair of bulls' moves in a circular path of 8 meter diameter. Input shaft rotates at 2 rpm when a pair of bulls' completes 2 rounds in one minute. Thus output shaft of speed increaser starts rotating at 200 rpm and consequently crankshaft of the pressure pump coupled to output shaft of speed increaser also rotating at 200 SPM discharges brackish water of 20 LPM at 300 psi pressure. Brackish water of 5000 mg/L TDS with 20 LPM discharge at 300 psi entering into RO membrane modules is bifurcated in two streams: one as permeate and other as concentrate. Permeate and concentrate streams were collected separately in two sintex water tanks. Flow rate and TDS of Permeate is 3 LPM/module and 600 mg/L respectively. The above setup is performed continuously for four hours.

EXAMPLE-3

Brackish water of 3000 mg/L is prepared similarly in water tank of same capacity and same operations as mentioned in examples 1&2 is repeated. Permeate and concentrate streams were collected separately in two water tanks. Flow rate and TDS of permeate is again measured. Not much variation in flow rate and TDS is observed. Setup is again performed continuously for four hours.

The Main Advantages of the Present Invention Are:
1. Animal power can be utilize for desalting brackish water in rural areas having no source of electric power or erratic power supply.
2. The device converts animal power into mechanical power for energizing the high-pressure pump.
3. The device can be utilized for industrial applications where conversion of high-torque low-speed into low-torque high-speed is required.
5. Separation mechanism can also be enhanced in village industries using the device.
6. Higher overall efficiency in desalination process is possible because this device requires two stage energy conversions whereas conventional desalination processes undergo three stage energy conversions.

We claim:

1. An animal powered mechanical water desalination device movable by a prime mover, the device comprising:
   (i) mechanical link means comprising a mechanical link for transmitting animal power to a speed increaser, said mechanical link means comprising an extended pipe;
   (ii) a speed increaser provided with an input shaft, the input shaft of the speed increaser being coupled to the mechanical link means such that the speed increaser converts animal power received from the mechanical link in the form of a first torque and speed to a second torque and speed, wherein the second torque is lower than the first torque and the second speed is higher than the first speed;
   (iii) high-pressure pump means, provided with a crankshaft which is connected to the output shaft of the speed increaser, for converting mechanical energy received from the speed increaser to hydraulic pressure energy and for generating a pressure of 300 psi; and
   (iv) osmotic means for using the hydraulic pressure energy from the high-pressure pump for converting brackish water into potable water.

2. A device as claimed in claim 1, wherein the mechanical link means comprises a link of a first steel of 230 mm length and the extended pipe is made of a second steel of 76 mm bore diameter, and 4000 mm length and 8 mm wall thickness, said second steel being stronger than the first steel.

3. A device as claimed in claim 1, wherein the speed increaser is of 510 mm×400 mm×300 mm dimension and comprises a gear set made of hardened steel.

4. A device as claimed in claim 1, wherein the high pressure pump is made of AISI-316 stainless steel material.

5. A device as claimed in claim 1, wherein the osmotic means comprises one or more reverse osmosis membranes.

6. A device as claimed in claim 1, wherein the mechanical link means is mounted on the input shaft of the speed increaser.

7. A device as claimed in claim 1, wherein the high pressure pump is provided with at least an inlet manifold for water suction and at least an outlet manifold connected to the osmotic means for generating hydraulic pressure for water desalination by the osmotic means.

8. A device as claimed in claim 1, wherein the prime mover comprises at least one draught animal.

9. A device as claimed in claim 8, wherein the draught animal is a bull.

10. A device as claimed in claim 8, wherein the prime mover comprises a pair of bulls.

11. A combination comprising the device as claimed in claim 1, and at least one draught animal harnessed to the extended pipe of the mechanical link means.

12. The combination as claimed in claim 11, wherein the draught animal is a bull.

13. A method of desalination of brackish water comprising the steps of:
   (a) providing the device as claimed in claim 1;
   (b) harnessing a draught animal to the extended pipe of the mechanical linking means and causing the animal to move in a circular path to generate animal power that in turn causes the high pressure pump means to pump brackish water to the osmotic means for desalination, and
   (c) a step of generating a pressure of 300 psi.

14. A method of desalination of brackish water comprising the steps of:
   (a) providing the device as claimed in claim 7; and
   (b) harnessing a draught animal to the extended pipe of the mechanical linking means and causing the animal to move in a circular path to generate animal power that in turn causes the high pressure pump to pump brackish water to the osmotic means for desalination.

* * * * *